United States Patent [19]

Suganuma et al.

[11] Patent Number: 5,065,256

[45] Date of Patent: Nov. 12, 1991

[54] METHOD OF AND APPARATUS FOR PROCESSING IMAGE SIGNAL

[75] Inventors: Atsushi Suganuma; Kayoko Ohsaki, both of Kanagawa, Japan

[73] Assignee: Fuji Photo Film Co., Ltd., Kanagawa, Japan

[21] Appl. No.: 687,777

[22] Filed: Apr. 19, 1991

Related U.S. Application Data

[63] Continuation of Ser. No. 375,755, Jul. 5, 1989, abandoned, which is a continuation-in-part of Ser. No. 247,144, Sep. 21, 1988, abandoned.

[30] Foreign Application Priority Data

Sep. 21, 1987 [JP] Japan .................................. 62-238353
Oct. 5, 1987 [JP] Japan .................................. 62-251952
Nov. 6, 1987 [JP] Japan .................................. 62-281862

[51] Int. Cl.$^5$ .............................................. H04N 1/40
[52] U.S. Cl. ..................................... 358/455; 358/443; 358/448
[58] Field of Search ............... 358/429, 447, 448, 455, 358/456, 458

[56] References Cited

U.S. PATENT DOCUMENTS 3,916,096 10/1975 Everett et al. .................. 178/6.6 R
4,340,912 7/1982 Troxel ................................. 358/283
4,394,662 7/1983 Yoshida et al. ...................... 358/298
4,450,485 5/1984 Oshikoshi et al. .................. 358/298
4,550,431 10/1985 Werth et al. ........................... 382/1

OTHER PUBLICATIONS

Halftone Image Produced by Pseudo-Random Bit Generator; G. L. Smith; IBM Tech Bull; vol. 17; #7; pp. 1858-1859; 12/74.
"Generalized Feedback Shift Register Pseudorandom Number Algorithm", Lewis and Payne, Jour. Assoc. for Computing Machinery, vol. 20, No. 8, Jul. 1973, pp. 456-468.

Primary Examiner—Edward L. Coles, Sr.
Assistant Examiner—Jerome Grant
Attorney, Agent, or Firm—Sughrue, Mion, Zinn, Macpeak & Seas

[57] ABSTRACT

An image signal is processed to grain digital image data by comparing digital random number data generated on the M-sequence coding theory and the digital image data with a binarizing digital comparator, and employing a signal produced by the comparison as grained binarized image data. The digital random number data are produced by a digital random number data generator comprising a random number generating circuit based on the M-sequences coding theory and an initial value presetting circuit for setting an initial value in said random number generating circuit.

4 Claims, 15 Drawing Sheets

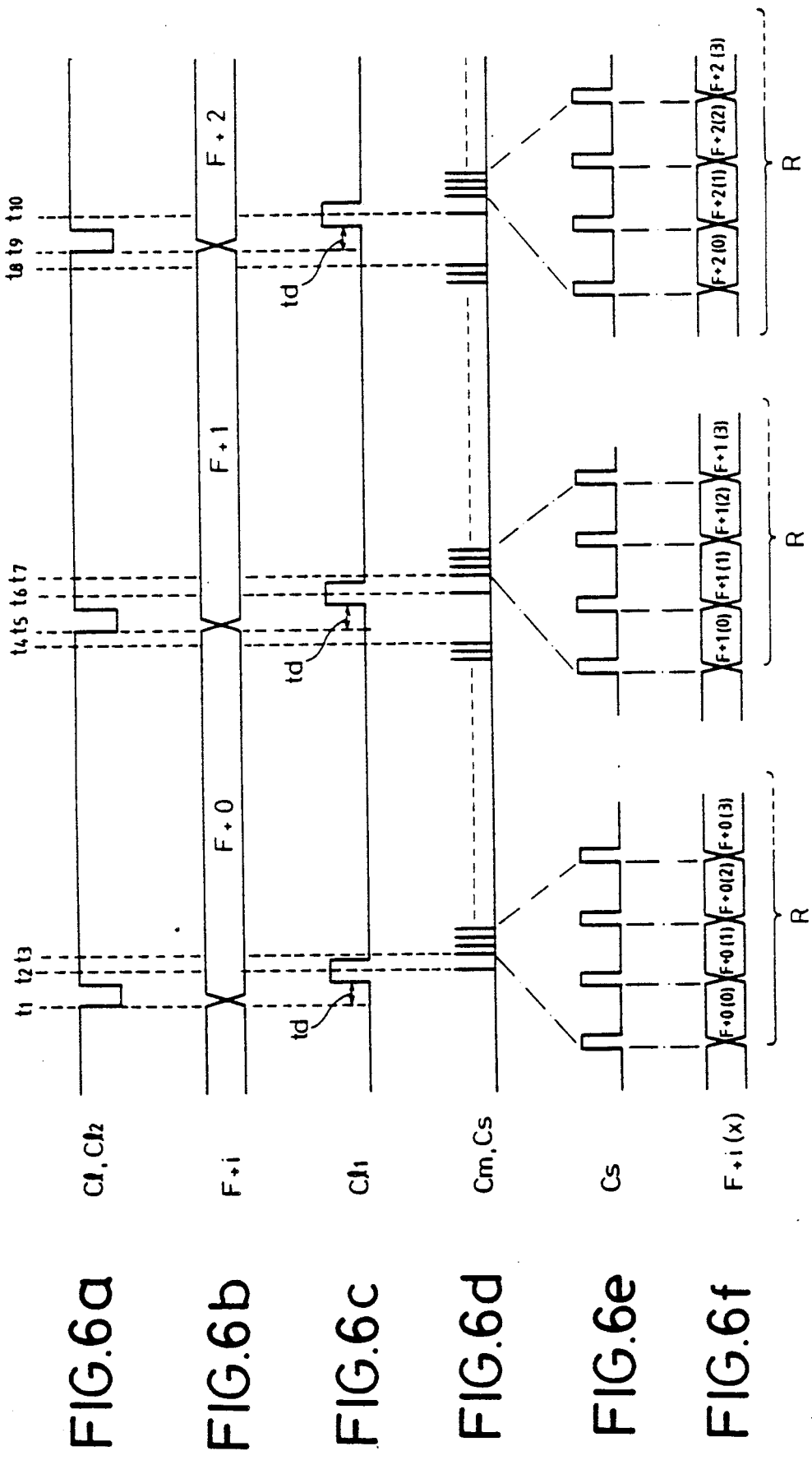

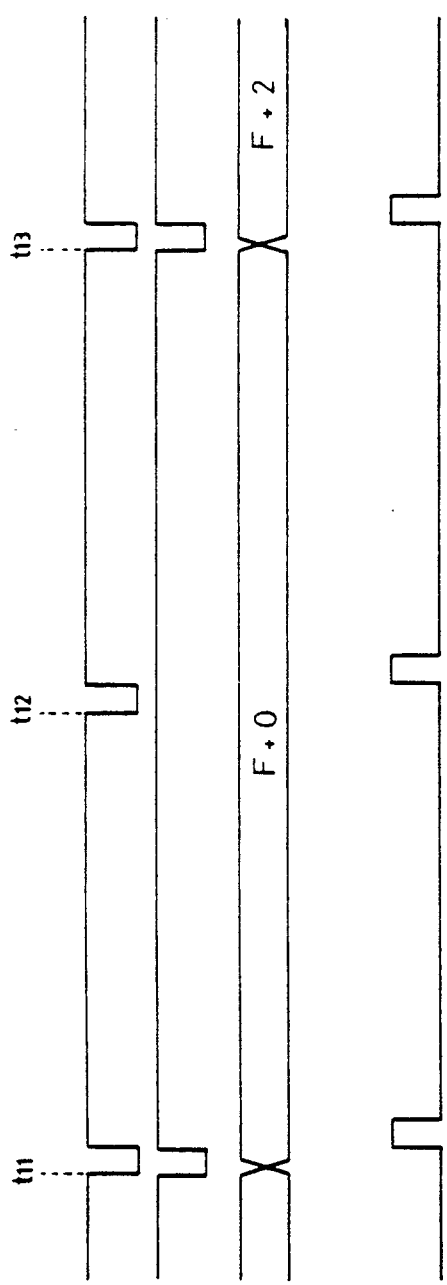
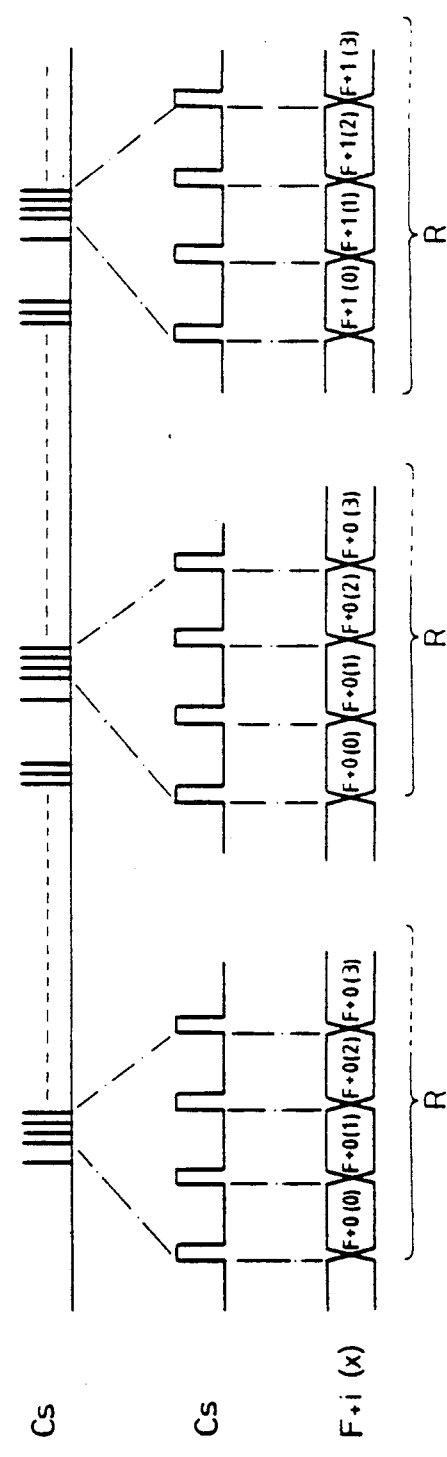
FIG.7a Cℓ
FIG.7b Cℓ2
FIG.7c F+i
FIG.7d Cℓ1
FIG.7e Cs
FIG.7f Cs
FIG.7g F+i(x)

METHOD OF AND APPARATUS FOR PROCESSING IMAGE SIGNAL

CROSS-REFERENCE TO RELATED APPLICATIONS

This is a continuation of Ser. No. 375,755 filed July 5, 1989, now abandoned which is a continuation-in-part application of U.S. Ser. No. 247,144 filed Sept. 21, 1988 now abandoned.

BACKGROUND OF THE INVENTION

The present invention relates to a method of and an apparatus for processing an image signal, which are suitable for incorporation in an image reading apparatus for platemaking or the like, and more particularly to a method of and an apparatus for processing an image signal produced by reading an image from a subject or original with a so-called line sensor, i.e., a light sensor comprising a linear array of photoelectric transducers, such that the produced image signal and a random number signal generated on the basis of the M-sequences coding theory are compared to produce a signal which is used to expose a film or the like to prepare a film plate or the like that bears a reproduced image which is grained with high quality.

Image scanning reproducing systems are widely used in the printing and platemaking industries for electrically processing image information of originals or subjects to produce original film plates with a view to simplifying the entire process and improving the quality of printed images.

The image scanning reproducing systems are basically constructed of an image reading apparatus and an image reproducing apparatus. In the image reading apparatus, image information of an original or subject which is fed in an auxiliary scanning direction in an image reading unit is scanned in a main scanning direction substantially normal to the auxiliary scanning direction, and the scanned image information is converted to an electric signal. Then, the photoelectrically converted image information is processed in the image reproducing apparatus for signal processing such as gradation correction, edge emphasis, and the like according to platemaking conditions. Thereafter, the processed image signal and a predetermined halftone dot reference signal are compared by a comparator, which issues a pulse-width-modulated binarized signal for producing halftone dots. The binarized signal is converted to a light signal such as a laser beam signal which is applied to and recorded on an image recording medium comprising a photosensitive material such as a photographic film. The image recording medium with the image recorded thereon is developed by an image developing device and will be used as a film plate for printing.

There has been proposed a graining mode as a special mode in the formation of halftone dots. In the graining mode, an image signal is processed to make a reproduced image look softer or higher in quality by obtaining image highlights and shadows as if through the density distribution of fine sand particles scattered around. A grained image is produced by comparing an original image signal and a graining reference signal. The graining reference signal should be a random number signal which is not periodic but highly random or a signal equivalent to the random number signal.

FIG. 1 of the accompanying drawings illustrates a conventional signal processing apparatus for producing a grained signal. The signal processing apparatus comprises a noise generator 2 composed of a zener diode $D_1$ as a noise source, resistors $R_1$, $R_2$, capacitors $C_1$, $C_2$, and a transistor $TR_1$, an amplifier 4 for amplifying an output noise signal from the noise generator 2, a D/A converter 6 for converting a digital image signal to an analog image signal, and an analog comparator 8 for comparing the analog image signal with the amplified noise signal which serves as a graining reference signal. The analog comparator 8 produces a pulse-width-modulated binarized signal as a grained signal.

The conventional signal processing apparatus is capable of producing a noise signal as a graining reference signal with an inexpensive arrangement. However, if the frequency of an image signal to be processed is higher, the D/A converter 6 and the analog comparator 8 should be those which operate at a higher speed, and hence the entire signal processing device will become highly expensive. If the frequency of the image signal exceeds several tens MHz, then the analog comparator 8 tends to fail to operate properly.

One proposed way of avoiding the use of the analog comparator 8 is to convert a graining reference signal generated by the noise generator 2 into a digital signal, and employ a digital comparator for comparing the digital graining reference signal and a digital image signal which is directly applied. According to this scheme, however, an A/D converter for converting the graining reference signal into the digital signal is required to be of high speed and high resolution, and is highly costly.

The above problem can be solved by producing a digital graining reference signal. More specifically, random numbers are stored as a graining reference signal in a memory, and the graining reference signal is read from the memory by a reading clock signal synchronous with an image signal and compared with the image signal by a digital comparator to generate a grained image signal.

This arrangement has its own drawback, however, in that since the memory is addressed by a counter, the graining reference signal is periodically read out of the memory, and as a result, a reproduced image is lowered in quality due to a periodic pattern of unevenness or irregularities. Such a periodic memory reading cycle may be removed by increasing the storage capacity of the memory, but the large-capacity memory is expensive.

Therefore, the conventional apparatus and arrangements described above fail to produce a high-quality grained image signal at high speed inexpensively.

SUMMARY OF THE INVENTION

It is a general object of the present invention to provide an apparatus for processing an image signal at a high speed and a low cost by generating random numbers used as a graining reference signal with a logic circuit based on the M-sequences coding theory without impairing the randomness of the random numbers, and by employing two random number generating systems to produce highly random numbers for generating a high-quality graining image signal.

Another object of the present invention is to provide a method of processing an image signal to grain digital image data, comprising the steps of comparing digital random number data generated on the M-sequences coding theory and the digital image data with a binarizing digital comparator, and employing a signal produced by the comparison as grained binarized image data.

Still another object of the present invention is to provide an apparatus for processing an image signal, comprising a digital comparator for comparing digital image data and graining reference data to produce grained image data, and a random number generator for producing, as the graining reference data, digital random number data based on the M-sequences coding theory.

Yet another object of the present invention is to provide the image signal processing apparatus wherein the random number generator comprises a random number generating circuit based on the M-sequences coding theory and an initial value presetting circuit for setting an initial value in the random number generating circuit.

Yet still another object of the present invention is to provide the image processing apparatus wherein the random number generating circuit has an output port comprising an N-bit shift register (N=2, 3, 4, ...), the arrangement being such that N-bit digital random number data are updated each time N shift clock pulses are applied.

Another object of the present invention is to provide the image signal processing apparatus wherein the random number generating circuit has an output port comprising an N-bit shift register (N=2, 3, 4, ...), the arrangement being such that N-bit digital random number data are updated each time a single shift clock pulse is applied.

A further object of the present invention is to provide an apparatus for processing an image signal, comprising at least two random number generating means data combining means for combining random number data produced by the random number generating means into digital random number data as a reference signal, and comparator means for comparing the digital random number data and digital image data and producing an output signal as a halftone dot image signal.

A still further object of the present invention is to provide the image signal processing apparatus wherein each of the random number generating means comprises logic circuits based on the M-sequences coding theory.

A yet further object of the present invention is to provide the image signal processing apparatus wherein the data combining means comprises a circuit for arranging the digital random number data from the random number generating means in a prescribed sequence to produce new digital random number data.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 6a–6f is a timing chart of operation of the random number generator shown in FIGS. 2 and 3;

FIG. 7a–7g is a timing chart of operation of the random number generator shown in FIGS. 2 and 3 with the frequency-dividing ratio of a frequency divider being varied;

DETAILED DESCRIPTION OF THE PREFERRED EMBODIMENTS

Figure 1:
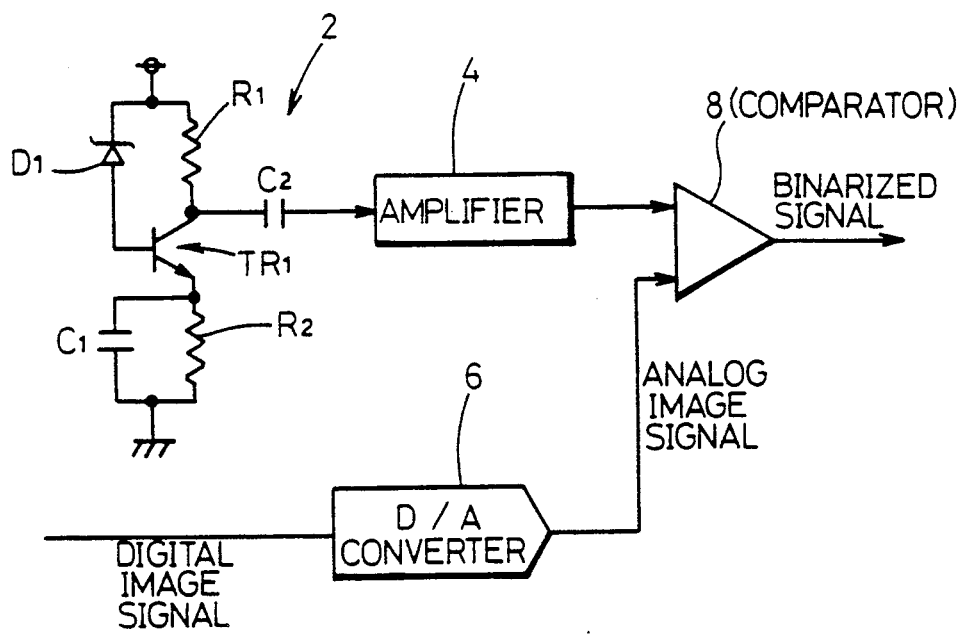
FIG. 1 is a block diagram of a conventional image signal processing apparatus.
Figure 2:
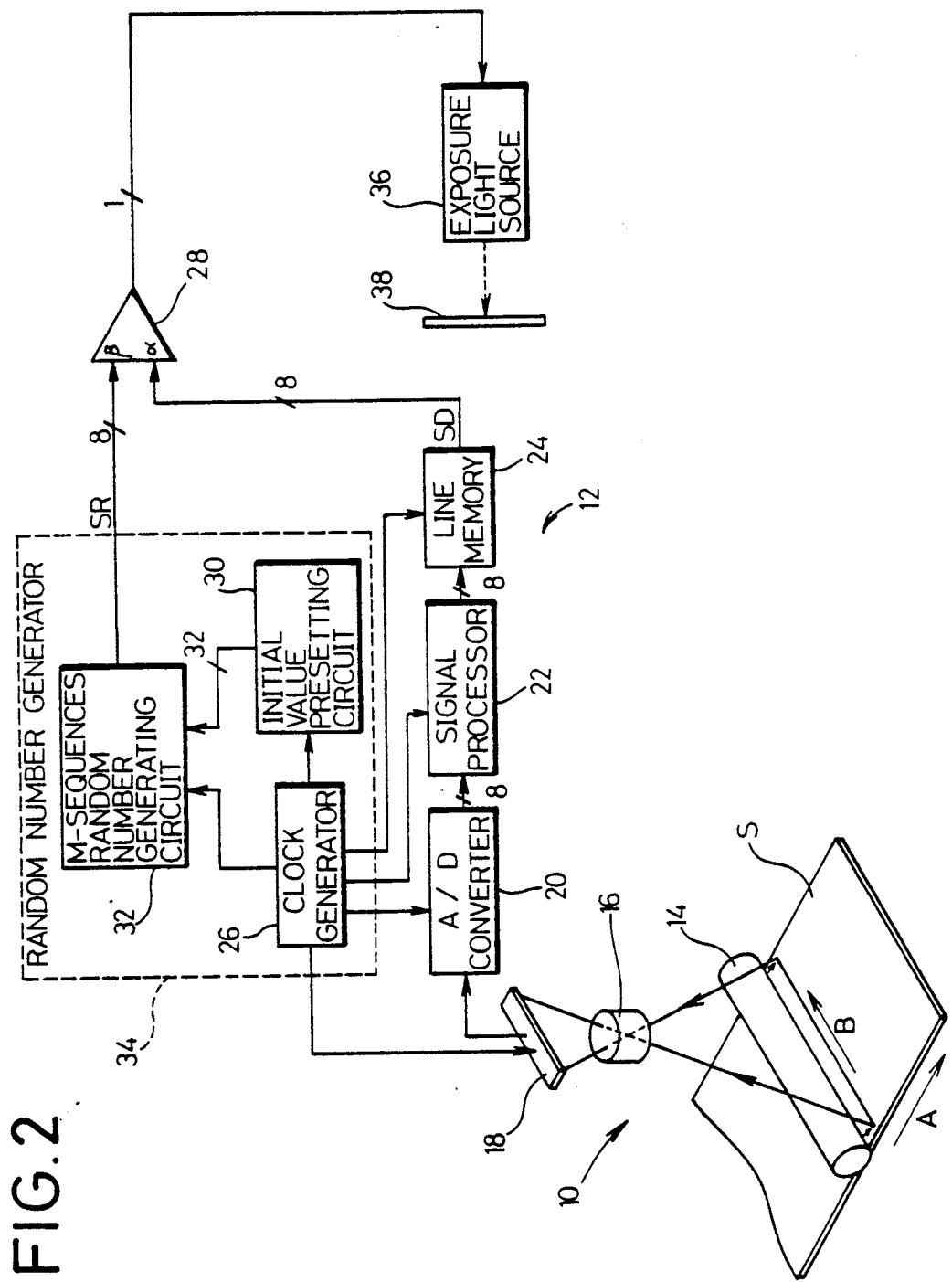
FIG. 2 is a block diagram, partly in perspective, of an image scanning reproducing system incorporating therein an image signal processing apparatus according to an embodiment of the present invention.

FIG. 2 shows an image scanning reproducing system 12 incorporating therein an image signal processing apparatus according to an embodiment of the present invention, the system 12 having a reading unit 10. In the reading unit 10, image information borne by a subject or original S is irradiated by illuminating light from a light source 14, and an image signal represented by light reflected from the subject S is applied through a condenser lens 16 to a CCD (charge-coupled device) or line sensor 18 and photoelectrically read by the CCD 18. The subject S is fed in an auxiliary scanning direction indicated by the arrow A by a feed mechanism (not shown), and at the same time the subject S is scanned in a main scanning direction indicated by the arrow B by the CCD 18, so that the image information on the entire area of the subject S is two-dimensionally scanned.

The image information photoelectrically converted by the CCD 18 is then applied to an A/D converter 20 and quantized thereby into 8-bit digital data, for example. The 8-bit digital data output from the A/D converter 20 are processed by a signal processor 22 for image correction such as gradation correction, edge emphasis, and the like, and the processed data are stored in a line memory 24. The CCD 18, A/D converter 20, the signal processor 22, and the line memory 24 are operated by clock pulses supplied from a clock generator 26.

The corrected 8-bit digital image data SD output from the line memory 24 are applied to a comparison input terminal o of a binarizing digital comparator 28. The binarizing digital comparator 28 has a reference input terminal β supplied with 8-bit digital random number data R which are output from a random generator 34 comprising the clock generator 26, an initial value presetting circuit 30, and an M-sequences random number generating circuit 32.

A process of generating random numbers based on the M-sequences coding theory is described in "Random Number Generation by Use of M-Sequence" written by Harada and Kashiwagi and published in Japan in Measurement and Automatic Control Society, collected papers, Vol. 23, No. 8, pages 26 through 31 (August 1987), or "Generalized Feedback Shift Register Pseudorandom Number Algorithm" written by Lewis and Payne and published in U.S.A. in Journal of the Association for Computing Machinery, Vol. 20, No. 3, pages 456 through 468 (July 1973). The Lewis and Payne process will hereinafter be referred to as a "GFSR process".

The digital random number data R as graining reference data and the digital image data SD are compared by the binarizing digital comparator 28. A binarized signal produced by the binarizing digital comparator 28 is of a level which is either higher or lower than the level of the digital random number data SR. The pulse-width-modulated binarized data issued from the binarizing digital comparator 28 are then applied to an exposure light source 36 which generates a laser beam, for example. The exposure light source 36 supplied with the binarized data emits light to expose an image recording medium 38 such as a photographic film, for example, to record image information on its photosensitive surface. The image recording medium 38 with the image information recorded thereon is sent to an image developing device (not shown) in which the image is developed to produce a film plate. In FIG. 2 and following figures, the arrows directed to the blocks represent the directions of signal flows, and the combination of a slash across an arrow and a nearby numeral (N=1, . . . ) indicates that the signal delivered along the arrow represents N-bit digital data.

Figure 3:
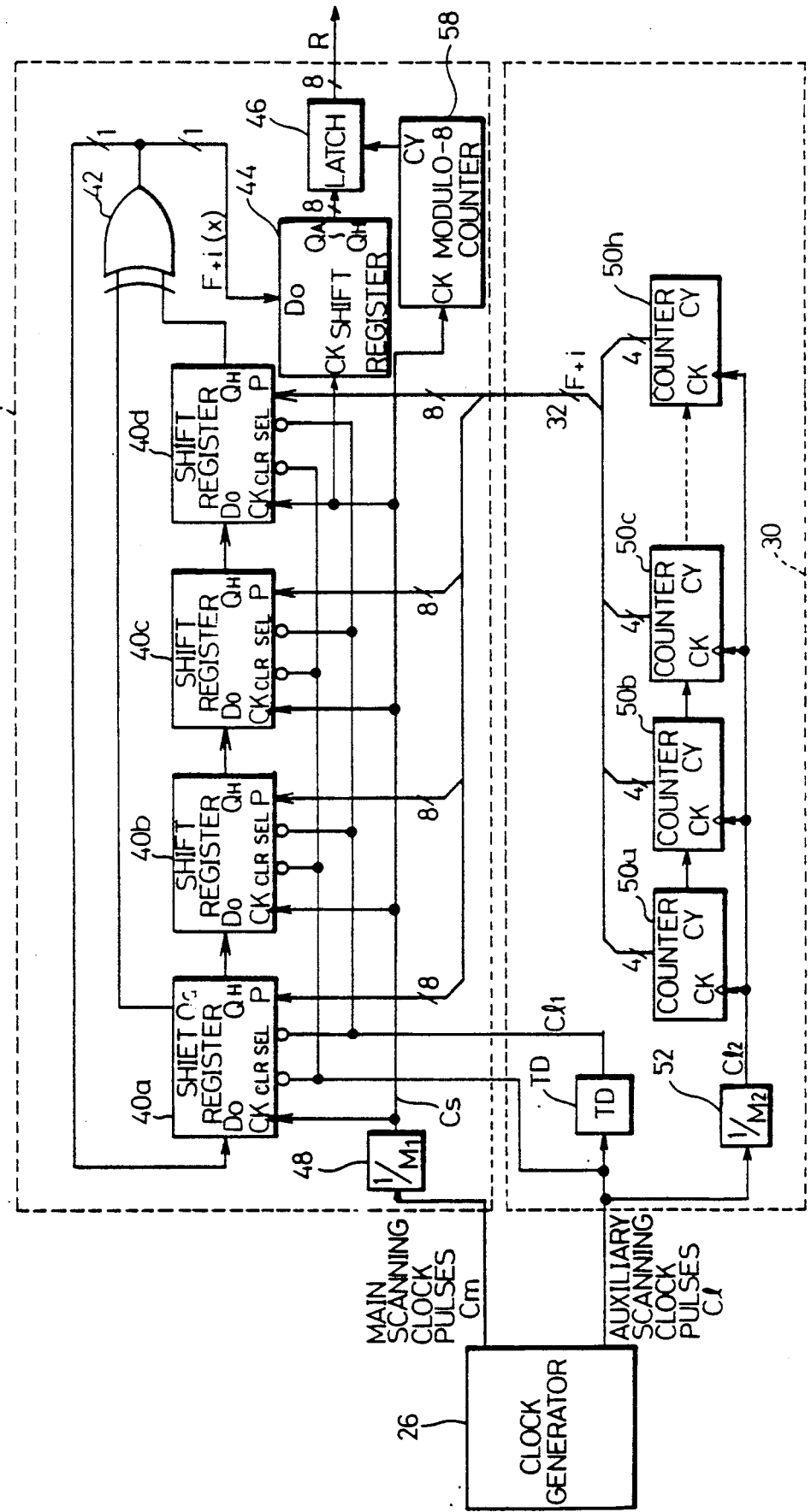
FIG. 3 is a block diagram of a random number generator in the image scanning reproducing system shown in FIG. 2.

FIG. 3 shows in detailed block form the random number generator 34 shown in FIG. 2 which is constructed of commercially available digital ICs based on an algorithm for generating random numbers through M-sequences (described later on).

As described above, the random number generator 34 comprises the clock generating circuit 26, the initial value presetting circuit 30, and the M-sequences random number generating circuit 32. The M-sequences random number generating circuit 32 comprises 8-bit serial-write shift registers 40a through 40d each having a serial data input terminal $D_O$, a clock input terminal CK, a data clear input terminal CLR, a function selector terminal SEL, 8-bit parallel data input terminals P ($P = P_A$ through $P_H$), and 8-bit parallel data output terminals Q ($Q = Q_A$ through $Q_H$).

The least-significant-bit (LSB) output terminals $Q_H$ of the shift registers 40a, 40b, 40c are connected respectively to the serial data input terminals $D_O$ of the following shift registers 40b, 40c, 40d. The seventh-bit output terminal $Q_G$ of the shift register 40a and the LSB output terminal $Q_H$ of the shift register 40d are connected to the input terminals of an exclusive-OR (EOR) 42. 1-bit random number data F+i(x) output from the EOR 42 is applied to the serial data input terminal $D_O$ of the shift register 40a, and also to a serial data input terminal $D_O$ of a serial/parallel converter shift register 44. The letter i in the 1-bit random data F+i(x) represents the number of auxiliary scanning clock pulses Cl, i.e., the number of scanning lines, and the letter x represents the number of shift clock pulses Cs.

When successive 1-bit random number data F+i(x) are held up to 8-bit data in the shift register 44, the 8-bit data are transferred from parallel output terminals $Q_A$ through $Q_H$ of the shift register 44 to a latch 46 which outputs the 8-bit digital random number data R. Therefore, an output port composed of the parallel output terminals $Q_A$ through $Q_H$ of the shift register 44 serve as the output port of the random number generator 34. To the latch circuit 46, there is connected a carry output terminal CY of a modulo-8 counter 58 with its clock input terminal supplied with shift clock pulses Cs.

Main scanning clock pulses Cm which are frequency-divided by $M_1$ (which is a positive integer) by a frequency divider 48 are applied to the clock input terminals CK of the shift registers 40a through 40d and 44. The frequency-dividing ratio $M_1$ of the frequency divider 48 can vary the manner in which random numbers are generated in the main scanning direction as described later on, and may be set to 1, 2, 3, 4, 6, or any of other desired values. The initial value presetting circuit 30 for determining an initial value of the shift registers 40a through 40d comprises eight 4-bit-output counters 50a through 50h which have carry output terminals CY connected in series, as shown, for outputting 32-bit initial value data F+i. The initial value data F+i are preset for each scanning starting point in the main scanning direction, i.e., newly preset for each auxiliary scanning clock pulse Cl, in order to provide correlation in the auxiliary scanning direction. Stated otherwise, the letter i in the initial value data F+i indicates the number of auxiliary scanning clock pulses Cl.

Auxiliary scanning clock pulses Cl are applied as auxiliary scanning frequency-dividing clock pulses $Cl_2$ to the clock input terminals CK of the 4-bit counters 50a through 50h via a frequency divider 52 having a frequency-dividing ratio $M_2$, which can vary the manner in which random numbers are generated in the auxiliary scanning direction. The auxiliary scanning clock signals Cl are also supplied to the data clear input terminals CLR of the shift registers 40a through 40d of the M-sequences random number generating circuit 32, and as auxiliary scanning delay clock pulses $Cl_1$ to the function selector terminals SEL of the shift registers 40a through 40d via a time delay element TD, such as a digital IC, e.g., an inverter, which has a delay time slightly longer than a data clear acquisition time inherent in the shift registers 40a through 40d, for reliably presetting an initial value of the shift registers 40a through 40d.

Operation and advantages of the image signal processing apparatus thus constructed will be described below.

In the reading unit 10 shown in FIG. 2, image information borne by the subject S is irradiated by illuminating light from the light source 14, and reflected light representing the image information is passed through the condenser lens 16 and photoelectrically read by the CCD 18 in response to each of the main scanning clock pulses Cm. At this time, the subject S is fed in the auxiliary scanning direction indicated by the arrow A by the non-illustrated feed mechanism. Therefore, since the subject S is also scanned in the main scanning direction of the arrow B by the CCD 18, the entire surface of the subject S is scanned to read the image information. The image information as photoelectrically converted by the CCD 18 is converted into 8-bit digital data by the A/D converter 20 each time a main scanning clock pulse Cm is applied. The 8-bit digital data output from the A/D converter 20, which will not be described in detail as they have no direct bearing on the present invention, are processed for gradation correction, edge emphasis, and the like by the signal processor 22, and stored in the line memory 24. The digital image data SD which are output from the line memory 24 and the digital random number data R as graining reference data from the random number generator 32 are compared by the binarizing digital comparator 28. A process of generating the digital random number data R will be described below based on the M-sequences coding theory.

According to the GFSR process referred to above, as shown in the middle of page 459 of the article, a random number Wk based on the M-sequences coding theory is expressed by the following equation (1):

$$Wk = Wk-p+q + Wk-p \tag{1}$$

where k, p, w indicate integers, and + an exclusive-OR operator. The equation (1) shows that a kth random number Wk is obtained by exclusive-ORing a (k-p-q)th random number Wk-p+q and a (k-p)th random number Wk-p. The article about the GFSR process, page 457, 3rd line from the bottom, clearly indicates that the symbol + represents an exclusive-OR operator.

In order to clearly show the relationship between the GFSR process and the present invention, the symbol W indicating a random number is replaced with the symbol R indicating the digital random number data. The equation (1) can then be rewritten as the following equation (2):

$$Rk = Rk-p+q + Rk-p \tag{2}$$

Figure 4:
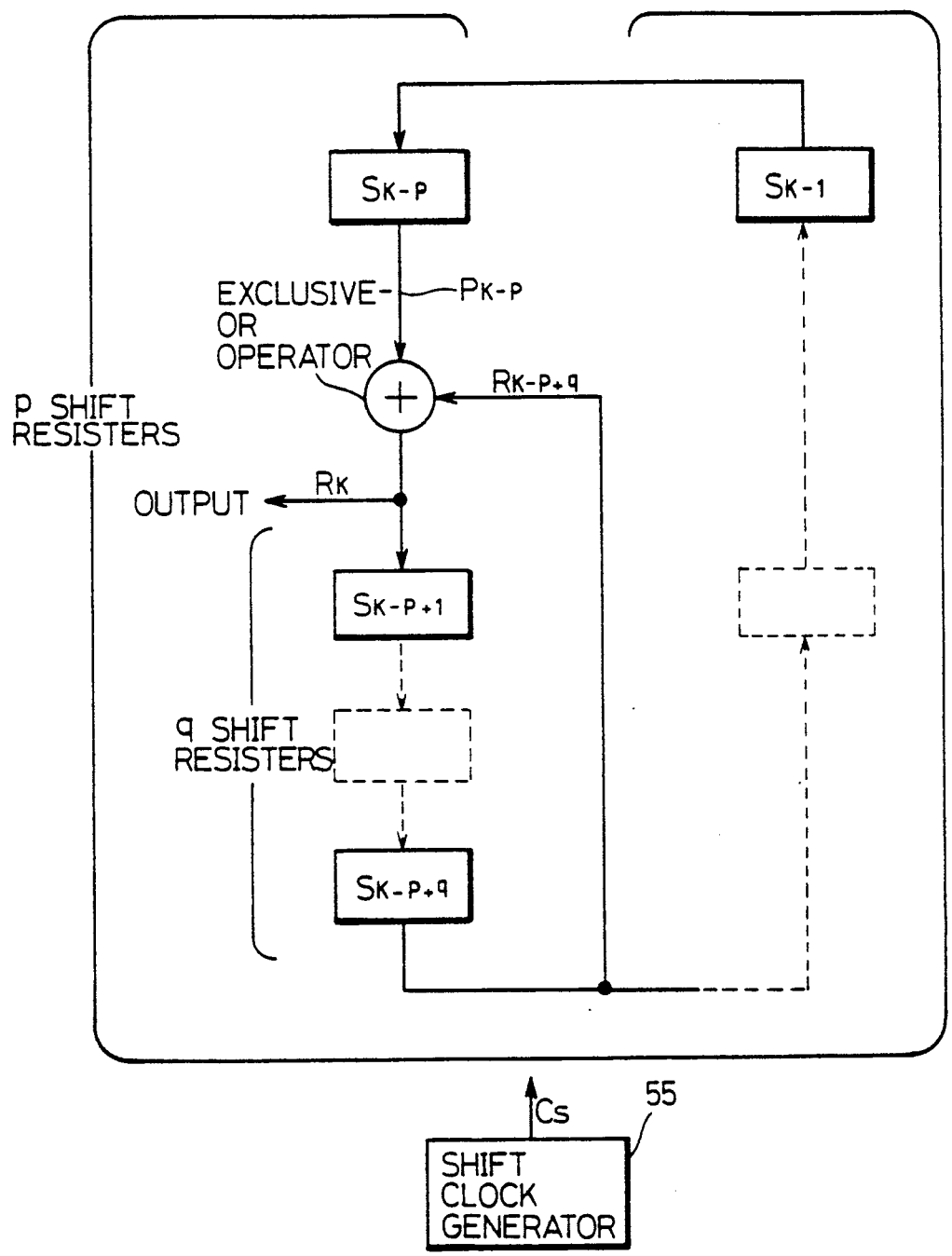
FIG. 4 is a diagram explaining the principles of an algorithm for generating random numbers based on the M-sequences coding theory.

To perform the equation (2) with hardware, as shown in FIG. 4, p shift registers Sk-p through Sk-1 are connected in a ring pattern, and output data Rk-p from the (-p)th shift registers Sk-p and output data Sk-p+q from the (-p+q)th shift register Sk-p+q are exclusive-ORed to produce digital random number data Rk, which are then given to the (-p+1)th shift register Sk-p+1. Data between the shift registers Sk-p and Sk-1 are transferred by applying shift clock pulses Cs from a shift clock generator 55 to respective clock input terminals (not shown) of the shift registers Sk-p through Sk-1.

Considerations should now be directed to how the integers p, q should be selected to grain a given image practically sufficiently based on the digital random number data Rk, or stated otherwise, how the periodic nature of random numbers should be selected to remove periodic irregularities or unevenness from a grained image. Derivation of the integers p, q will be described below.

As shown in the GFSR process paper, page 461, line 2, the period m of random numbers based on the M-sequences coding theory is given by the following equation (3):

$$m = 2^p - 1 \tag{3}$$

Where the random number period m is smaller than the number of pixels making up an image area, if an image drawn within the image area is grained using digital random number data Rk having the period m, then striped or tile-pattern irregularities synchronous with the period m are produced, lowering the image quality. Therefore, it is required that the period m be greater than the number of pixels making up the image area.

It is assumed that the size of an image area on the image recording medium 38 is A2 size (about 450×620 mm²), for example, and the spot size of the exposure light beam emitted from the exposure light source 36 toward the image recording medium 38, i.e., the size of a pixel, is 25×25 μm². It can then be understood that the number n of pixels is given by the following equation (4)

$$n = \frac{A2 \text{ size}}{\text{pixel size}} \tag{4}$$

$$\approx \frac{450 \times 620 \text{ mm}^2}{25 \times 25 \text{ }\mu\text{m}^2} \approx 450 \times 10^6$$

Therefore, the random number period m should be of a value greater than the number n of pixels = 450×10⁶. The integer p should be selected such that the following formula (5) can be satisfied:

$$2^p - 1 \geq 450 \times 10^6 \tag{5}$$

By solving the formula (5) for p and in view of the fact that p is an integer, p should be selected as follows:

$$p \geq 29 \tag{6}$$

Shift register ICs which are commercially available now comprise four or eight shift registers in one IC package. For example, a shift register IC, SN74LS299 type, manufactured by Texas Instruments comprises eight shift registers. The integer p which corresponds to the number of these shift registers is then selected to be a value which is a multiple of 8 and greater than 29, e.g., a value as shown by the following equation (7):

$$p = 32 \tag{7}$$

With the integer p thus determined, the period of the digital random number data Rk is of a value that is sufficiently larger than the number of pixels which make up one image area.

Figure 9:
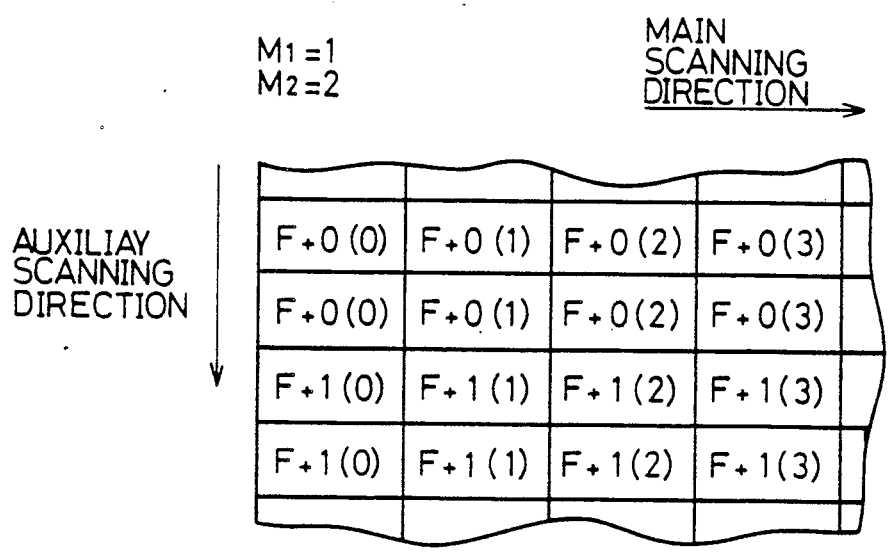
Figure 10A:
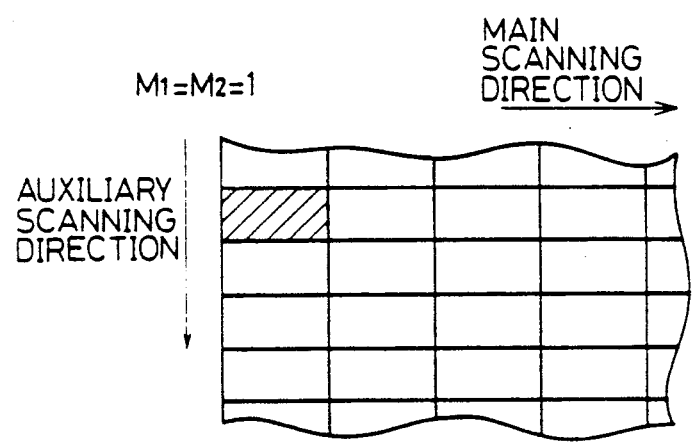
FIGS. 10(a) through 10(d) are diagrams showing random number data generated when the frequency-dividing ratio of the frequency divider in the random number generator of FIG. 3 is differently varied.
Figure 10B:
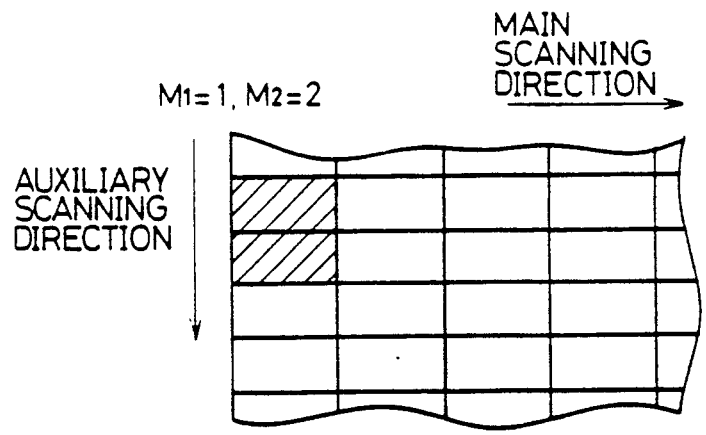
Figure 10C:
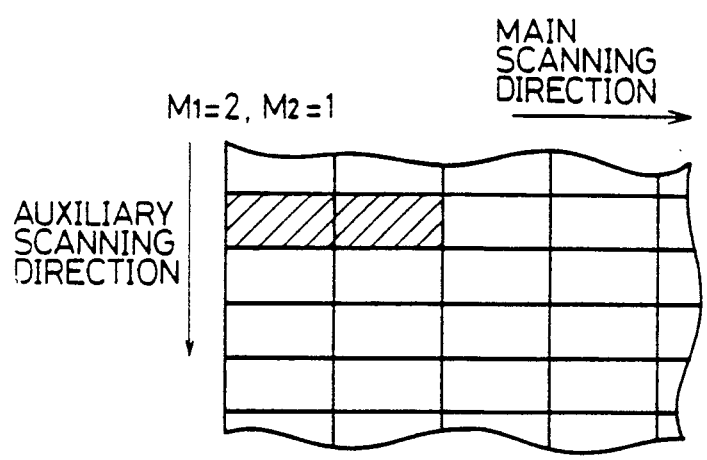
Figure 10D:
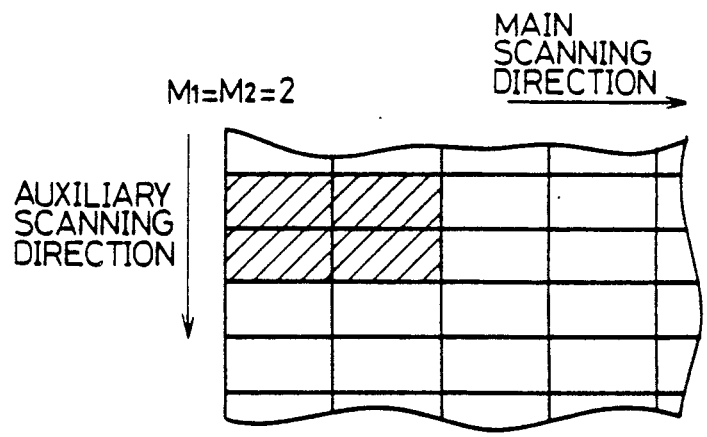

Selection of the integer q will be described below. FIG. 9 in page 463 of the GSFR process paper shows combinations of some integers p, q. For example, when p is p=47, q is q=5, 14, 20, 21. However, FIG. 9 does not indicate a value of q corresponding to p=32. The inventors evaluated the randomness of produced digital random number data Rk with respect to q in the range of from 1 to 31, using FACOM M-160 computer manufactured by Fujitsu, and found that the randomness of random numbers is high, i.e., the probability that the same random numbers are produced is small, when q=7.

Figure 5:
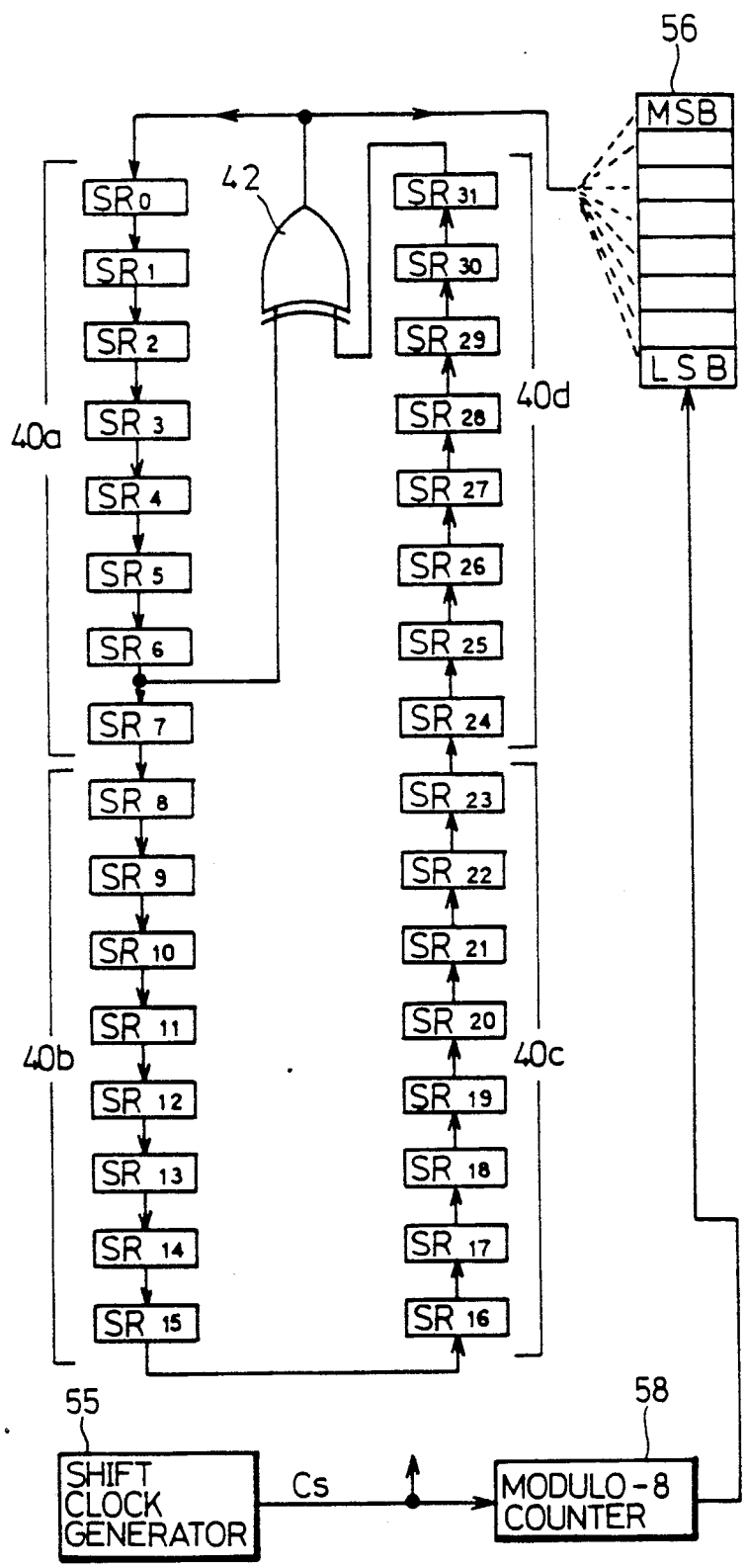
FIG. 5 is a diagram explaining the principles of an algorithm for generating random numbers with the random number generator illustrated in FIGS. 2 and 3.

If the integers p, q are selected as p=32 and q=7, respectively, then it can be understood with reference to FIG. 4 that the principles of generating random numbers based on the M-sequences coding theory are given as shown in FIG. 5.

FIG. 5 shows an algorithm for generating 8-bit random numbers. Denoted at 32 (p=32) SR₀ through SR₃₁ are 1-bit shift registers, respectively, which make up the shift registers 40a through 40d (each corresponding to SN74LS299 manufactured by TI). The shift registers SR₀ through SR₃₁ are connected in series. The output data from the seventh (q=7) shift register $R_6$ (which data correspond to the output terminal $Q_G$ of the shift register 40a) and the output data from the thirty-second (p=32) shift register $SR_{31}$ (which data correspond to the output terminal $Q_H$ of the shift register 40d) are input signals to the EOR 42. The output data from the EOR 42 are applied to an output buffer 56 having 8-bit output ports, and also to the input terminal of the first shift register $SR_0$.

The shift registers $SR_0$ through $SR_{31}$ are given an initial value of 0 or 1. When eight shift clock pulses Cs from the shift clock generator 55 are applied to the shift registers $R_0$ through $R_{31}$, the output buffer 56 stores 8-bit random number data. The random number data in the output buffer 56 are output as 8-bit parallel random number data each time a carry output signal is applied from the modulo-8 counter 58. If the initial values of the shift registers $SR_0$ through $SR_{31}$ are all preset values other than 0, then there is no limitation on the initial values. The random numbers so produced have a periodic nature which is represented by $2^{32}-10^{9.6}-4$ billions. This numerical value is sufficiently larger than the number of pixels contained in an A2 size original, and the generated random numbers are therefore sufficiently random, as described above.

The circuit arrangement shown in FIG. 3 is constructed on the basis of the algorithm of FIG. 5, using commercially available ICs. As described above, the shift registers $SR_0$ through $SR_7$ shown in FIG. 5 correspond to the shift register 40a shown in FIG. 3, the shift registers $SR_8$ through $SR_{15}$ to the shift register 40b, the shift registers $SR_{16}$ through $SR_{23}$ to the shift register 40c, the shift registers $SR_{24}$ through $SR_{31}$ to the shift register 40d, and the output buffer 56 to the shift register 44. The shift clock generator 55 shown in FIG. 5 corresponds to the combination of the shift clock generator 26 and the frequency divider 48 shown in FIG. 3.

Operation of the random number generator 34 shown in FIG. 3 will be described with the reference to the timing chart of FIGS. 6a–6f. It is assumed that the frequency dividers 48, 52 have respective frequency-dividing ratios $M_1=M_2=1$.

An auxiliary scanning clock pulse Cl is generated at a time $t_1$ (see FIG. 6(a)). When the auxiliary scanning clock pulse Cl is applied to the data clear input terminals CLR of the shift registers 40a through 40d, output signals from the data output terminals $Q_A$ through $Q_H$ of the shift registers 40a through 40d are all reduced to 0 by the negative-going edge of the clock pulse (at $t_1$).

In response to the negative-going edge (at $t_1$) of an auxiliary scanning clock pulse Cl2 (which has substantially the same waveform as the auxiliary scanning clock pulse Cl) supplied through the frequency divider 52, the counters 50a through 50h of the initial value presetting circuit 30 count clock pulses, and supply new 32-bit initial value data F+0 to the parallel data input terminals P of the shift registers 40a through 40d, 8 bits for each (see FIG. 6(b)). More specifically, the output data of the counters 50a, 50b are supplied as input data to the shift register 40a, the output data of the counters 50c, 50d as input data to the shift register 40b, the output data of the counters 50e, 50f as input data to the shift register 40c, and the output data of the counters 50g, 50h as input data to the shift register 40d.

An auxiliary scanning clock pulse $Cl_1$ is delayed for a delay time td (see FIG. 6(c)) by the time delay element TD, and inverted. The delayed and inverted auxiliary scanning clock pulse $Cl_1$ is applied to the function selector terminals SEL of the shift registers 40a through 40d. The function selector terminals SEL are rendered effective when the input signals applied thereto are high in level. When a shift clock pulse Cs which is substantially the same as a main scanning clock pulse Cm is applied to the clock input terminals CK of the shift registers 40a through 40d at a time $t_2$ (see FIG. 6(d)), the initial value data F+0 applied to the parallel data input terminals P are delivered to the data output terminals $Q_A$ through $Q_H$ of the shift registers 40a through 40d in synchronism with the shift clock pulse Cs.

Then, between times $t_3$ and $t_4$, 1-bit random number data F+i(x) are produced as F+0(0), F+0(1), F+0(2), F+0(3), ..., as shown in FIGS. 6(e) and 6(f) at an enlarged scale, each time a shift clock pulse Cs is applied to the cock input terminals CK of the shift registers 40a through 40d, and are successively fed to the serial data input terminal $D_O$ of the serial/parallel converter shift register 44. The parallel data output terminals $Q_A$ through $Q_H$ of the serial/parallel converter shift register 44 then successively produce 8-bit data which are then held as digital random number data R in the latch circuit 46 each time a carry is produced by the modulo-8 Counter 58 is produced, i.e., 8 shift clock pulses Cs are applied to the modulo-8 counter 58.

The output data from the latch 46, i.e., the digital random number data R from the random number generator 32, are compared with the digital image data SD by the binarizing digital comparator 28, as shown in FIG. 2, and produced binarized data, i.e., grained image data, are applied as an output signal from the digital comparator 28 to the exposure light source 36. Based on the binarized data, the image recording medium 38 such as a photographic film is exposed, in an area corresponding to one scanning line, to record the grained image information.

Then, the same operation as that between times $t_1$ through $t_4$ is effected between times $t_5$ and $t_6$ in FIG. 6. More specifically, at the time $t_6$, the initial value data F+0 are updated into F+1 by a frequency divided auxiliary scanning clock pulse $Cl_2$ (see FIG. 6(b)), and the updated initial value data F+1 are set in the shift registers 40a through 40d by an auxiliary scanning clock pulse $Cl_1$ at the time $t_6$. 1-bit random number data F+1(0), F+1(1), F+1(2), F+1(3), ... are fed to the serial/parallel converter shift register 44 by shift clock pulses generated after the time t, as shown in FIG. 6(f), after which digital random number data R are held in the latch circuit 46 by the modulo-8 counter 58 each time 8 shift clock pulses Cs are applied thereto.

The digital random number data R are then compared with the digital image data SD corresponding to the next scanning line by the binarizing digital comparator 28. Based on the produced binarized data, the image recording medium 38 is exposed, in an area corresponding to the next scanning line, to record the grained image information.

The same operation is subsequently effected also after a time $t_9$. The initial value data F+1 are updated into F+2 (see FIG. 6(b)), and 1-bit random number data F+1(x) are generated as F+2(0), F+2(1), F+2(2), F+2(3), ... in response to shift clock pulses Cs. Random number data produced on these data and the digital image data SD corresponding to the next scanning line are compared with each other by the binarizing digital comparator 28, and the image recording medium 38 is exposed, in an area corresponding to the next scanning line, is exposed to record the grained image information.

After the grained image has been recorded on the image recording medium 38, the image is developed by the image developing device (not shown) to produce a film plate. Since the periodicity of the random numbers is large, an image reproduced by the image carried on the film plate is a high-quality grained image which is free of striped or tile-pattern irregularities.

Generation of random numbers with the frequency-dividing ratios of the frequency dividers 48, 52 being $M_1 = 1$, $M_2 = 2$, respectively, will be described below.

As shown in FIG. 7, initial value data $F+x$ are updated each time auxiliary scanning clock pulses Cl are applied (see times $t_{11}$ and $t_{13}$). 1-bit random number data $F+i(x)$ regarding the first scanning line, and 1-bit random number data $F+i(x)$ regarding the next scanning line become the same random number data $\{F+0(0), F+0(1), F+0(2), F\ 0(3), \ldots\}$ (see FIG. 7(g)).

This is based on the fact that, as can be understood from FIG. 5 showing the algorithm of the M-sequences coding theory, after a certain initial value is given to generate random numbers, all of the values in the shift registers $SR_0$ through $SR_{31}$ are cleared to 0, and when the same initial value as the certain initial value is given, the same random numbers are generated.

Figure 8:
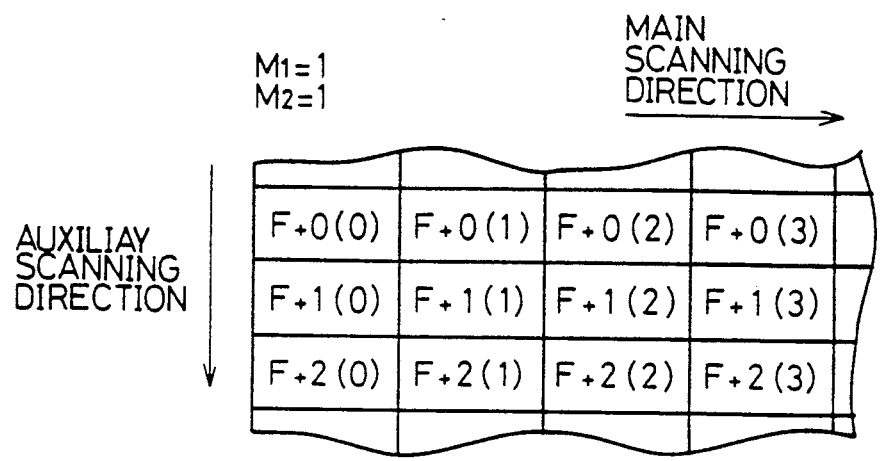
FIGS. 8 and 9 are diagrams showing random number data generated by the random number generator operated according to the timing charts of FIGS. 6a–6f and 7a–7g.

The 1-bit random number data $F+i(x)$ produced when the frequency-dividing ratios $M_1$, M, of the frequency dividers 48, 52 are $(M_1=M_2=1)$ and $(M_1=1, M_2=2)$ are arranged in the main and auxiliary scanning directions B, A as shown in FIGS. 8 and 9. An image grained based on the random number data shown in FIG. 9 is coarser or rougher than an image grained based on the random number data shown in FIG. 8. By selecting the values of the frequency-dividing ratios $M_1$, $M_2$ to suit the preference of the user, an image can be grained dependent on the quality of the original image or the quality of an image to be finished.

FIGS. 10(a) through 10(d) show the same random number data, as hatched, when the frequency-dividing ratios $M_1$, $M_2$ are $(M_1=M_2=1)$, $(M_1=1, M_2=2)$, $(M_1=2, M_2=1)$, and $(M_1=M_2=2)$.

In the above embodiment, the shift clock pulses Cs for driving the shift registers 40a through 40d are applied through the frequency divider 48. The frequency divider 48 may be a multiply-by-8 multiplier comprising a PLL frequency synthesizer for generating digital random numbers in 1:1 correspondence to the digital image data SD fed to the binarizing digital comparator 28 each time a main scanning clock signal Cm is applied, so that the image can be grained more finely.

In the above embodiment, as shown in FIGS. 3 and 5, the random number input ports connected to the EOR 42 lead from the output terminal of the seventh shift register $R_6$ (which output terminal corresponds to the seventh output terminal $Q_G$ of the shift register 40a) and the output terminal of the thirty-second shift register $SR_{31}$ (which output terminal corresponds to the eighth output terminal $Q_H$ of the shift register 40d). However, it has been confirmed by the inventors that the random number input can be derived from the output terminal of the shift register $SR_2$ or the output terminal of the shift register $SR_4$ rather than the shift register $R_6$ to produce random numbers.

Furthermore, while an image signal is grained by the 8-bit random number data in the above embodiment, random number data for graining an image signal may be 10 bits, 12 bits, or other desired bits. While 32 shift registers are employed in the embodiment, the number of shift registers used may be varied in relation to the size of a pixel.

In the aforesaid illustrated embodiment, as can be understood from the algorithm of FIG. 5, of 1-bit random number data $F+i(x)$ (see FIG. 11) produced from the EOR 42 each time eight pulses of the shift clock signal Cs are applied, 8-bit data $F+0(0)$ through $F+0(7)$ are put together as first digital random number data $R\alpha$, and next 8-bit data $F+0(8)$ through $F+0(15)$ are put together as second digital random number data $R\beta$. Thus, the digital random number data R are constructed as follows:

$$R = R\alpha, R\beta, R\gamma, \ldots \quad (8)$$
$$R\alpha = \{F + 0(0), F + 0(1), \ldots, F + 0(7)\} \quad (9)$$
$$R\beta = \{F + 0(8), F + 0(9), \ldots, F + 0(15)\} \quad (10)$$
$$R\gamma = \{F + 0(16), F + 0(17), \ldots, F + 0(23)\} \quad (11)$$

Figure 11:
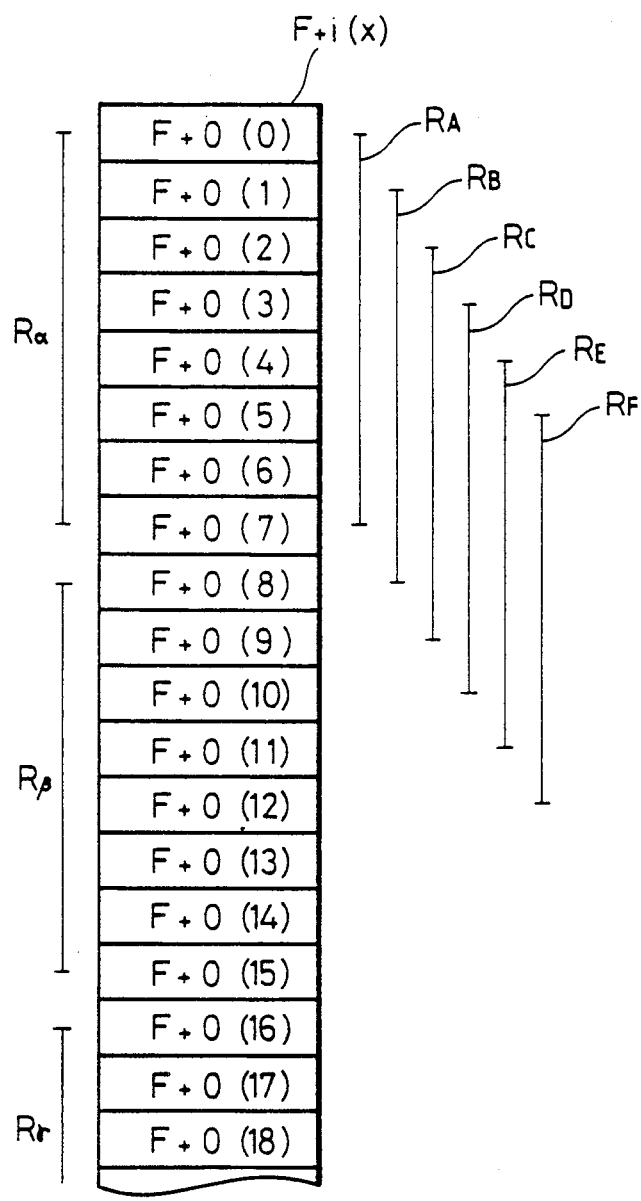
FIG. 11 is a diagram explaining the principles of generation of 8-bit random numbers at a high speed.

(see FIG. 11).

The digital random number data R may instead be produced as follows: First digital random number data $R_A$ are produced in response to up to eight pulses of the shift clock signal Cs. Second digital random number data $R_B$ are constructed such that of 1-bit random number data $F+i(x)$ produced from the EOR 42 by the ninth clock pulse, the data $F+0(8)$ is used as the MSB, and the seven upper-order bits comprise the seven lower-order bits $F+0(1)$ through $F+0(7)$ of the first digital random number data $R_A$, with the LSB data thereof being removed. Thus, the digital random number data R which is updated each time a shift clock pulse Cs is applied may be constructed as follows:

$$R = R_A, R_B, R_C, \ldots \quad (12)$$
$$RA = \{F + 0(0), F + 0(1), \ldots, F + 0(7)\} \quad (13)$$
$$RB = \{F + 0(1), F + 0(2), \ldots, F + 0(8)\} \quad (14)$$
$$RC = \{F + 0(2), F + 0(3), \ldots, F + 0(9)\} \quad (15)$$

These latter random number data $R_A$, $R_B$, ... are not mathematically random numbers, but it has been confirmed by the inventors through experiments that these random number data can well be utilized as random numbers for graining a image. Since in this process of random number data generation the speed at which the digital random number data R are produced may be 8 times lower than the above process, the performance required of the hardware may also be lowered as much.

Figure 12:
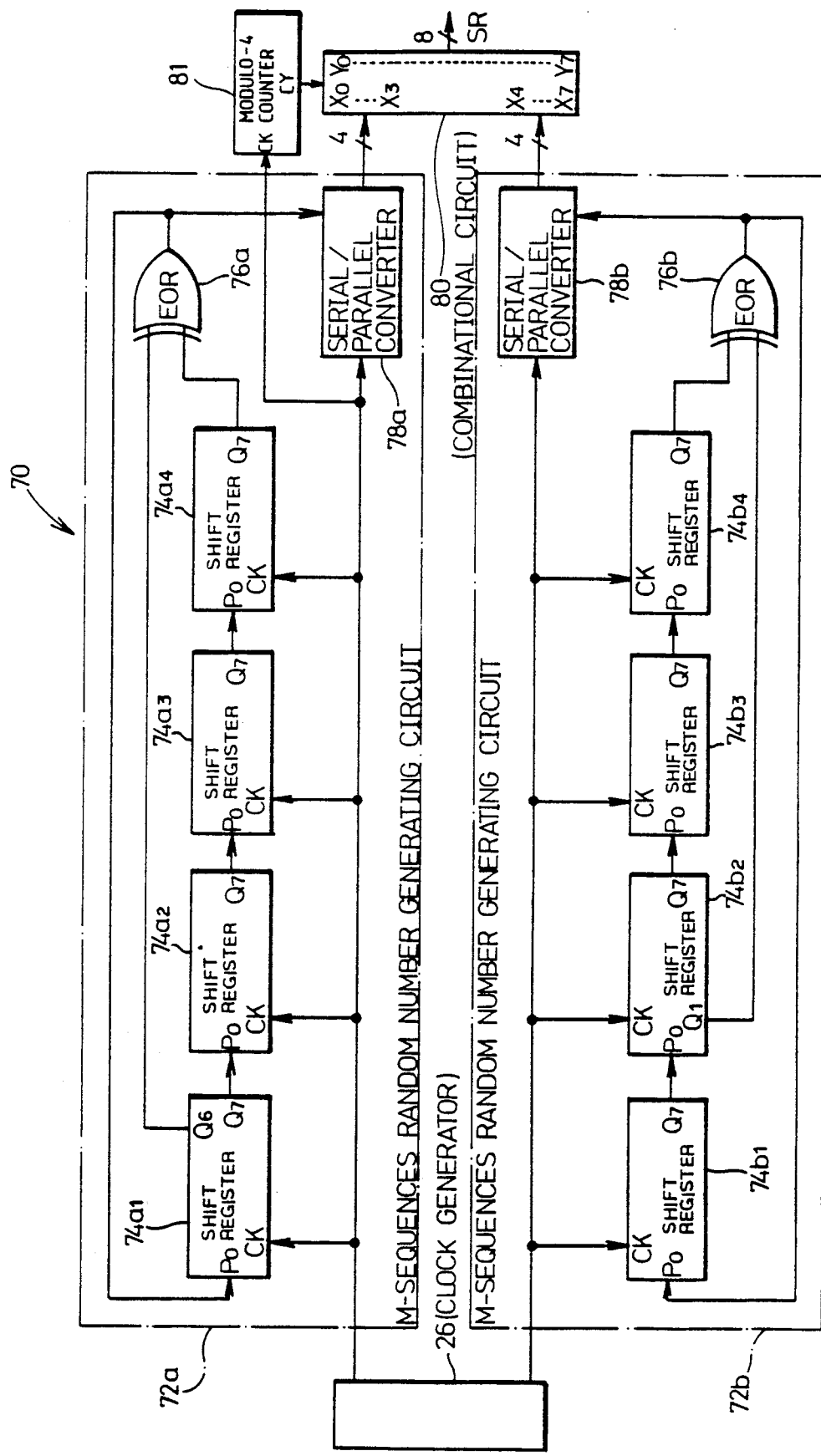
FIG. 12 is a block diagram of a random number generator according to another embodiment of the present invention

FIG. 12 is a block diagram of a random number generating circuit 70 according to another embodiment of the present invention. The random number generating circuit 70 comprises different M-sequences random number generating circuits 72a, 72b for producing higher-order 4 bits and lower-order 4 bits of 8-bit digital random number data R, so that the digital random number data R can be produced at high speed. The M-sequences random number generating circuit 72a as a first random number generating means comprises 8-bit shift registers $74a_1$ through $74a_4$, an EOR 76a, and a 4-bit serial/parallel converter 78a. Each of the shift registers $74a_1$ through $74a_2$ has a clock input terminal CK, 8-bit parallel data input terminals $P(P=P_0$ through $P_7)$, and 8-bit parallel data output terminals $Q(Q=Q_0$ through $Q_7)$. The LSB output terminals $Q_7$ of the shift registers $74a_1$, $74a_2$, $74a_3$ are connected respectively to the input terminals $P_0$ of the following shift registers $74a_2$, $74a_3$, $74a_4$. The seventh-bit output terminal $Q_6$ of the shift register $74a_1$ and the LSB terminal $Q_7$ of the shift register $74a_4$ are connected to the input terminals of the EOR $76a$. 1-bit random number data output from the EOR $76a$ is applied to the input terminal $P_0$ of the shift register $74a_1$ and also to an input terminal of the serial/parallel converter $78a$ which has another input terminal and four output terminals.

A combinational circuit 80 as a data combining means has input terminals $X_0$ through $X_7$ and output terminals $Y_0$ through $Y_7$, which are combined in a prescribed combination. The combinational circuit 80 may be a latch circuit, for example. The output terminals of the serial/parallel converter $78a$ are connected to the input terminals $X_0$ through $X_3$ of the combinational circuit 80. The serial/parallel converter $78a$ applies 4-bit random number data composed 4 1-bit random number data to the input terminals $X_0$ through $X_3$ of the combinational circuit 80.

The M-sequences random number generating circuit $72b$ as a second random number generating means is of a construction substantially identical to that of the M-sequences random number generating circuit $72a$ (those parts of the circuit $72b$ which are identical to those of the circuit $72a$ are represented by identical reference numerals with a suffix b). The serial/parallel converter $78b$ has its output terminals connected to the input terminals $X_4$ through $X_7$ of the combinational circuit 80, and outputs 4-bit random number data comprising 4 1-bit random number data to the combinational circuit 80. The M-sequences random number generating circuit $72b$ is different from the M-sequences random number generating circuit $72a$ in that one of the input terminals of the EOR $76b$ is connected to the second-bit output terminal $Q_1$ of the shift register $74b_2$.

In this embodiment, a modulo-4 counter 8 is connected to the combinational circuit 80 for supplying data latching clock signals to the combinational circuit 80.

The shift registers $74a_1$ through $74a_4$ and $74b_1$ through $74b_4$ of the M-sequences random number generating circuits $72a$, $72b$ are connected to an initial value presetting circuit which is omitted from illustration in FIG. 12 for the sake of brevity.

Figure 13:
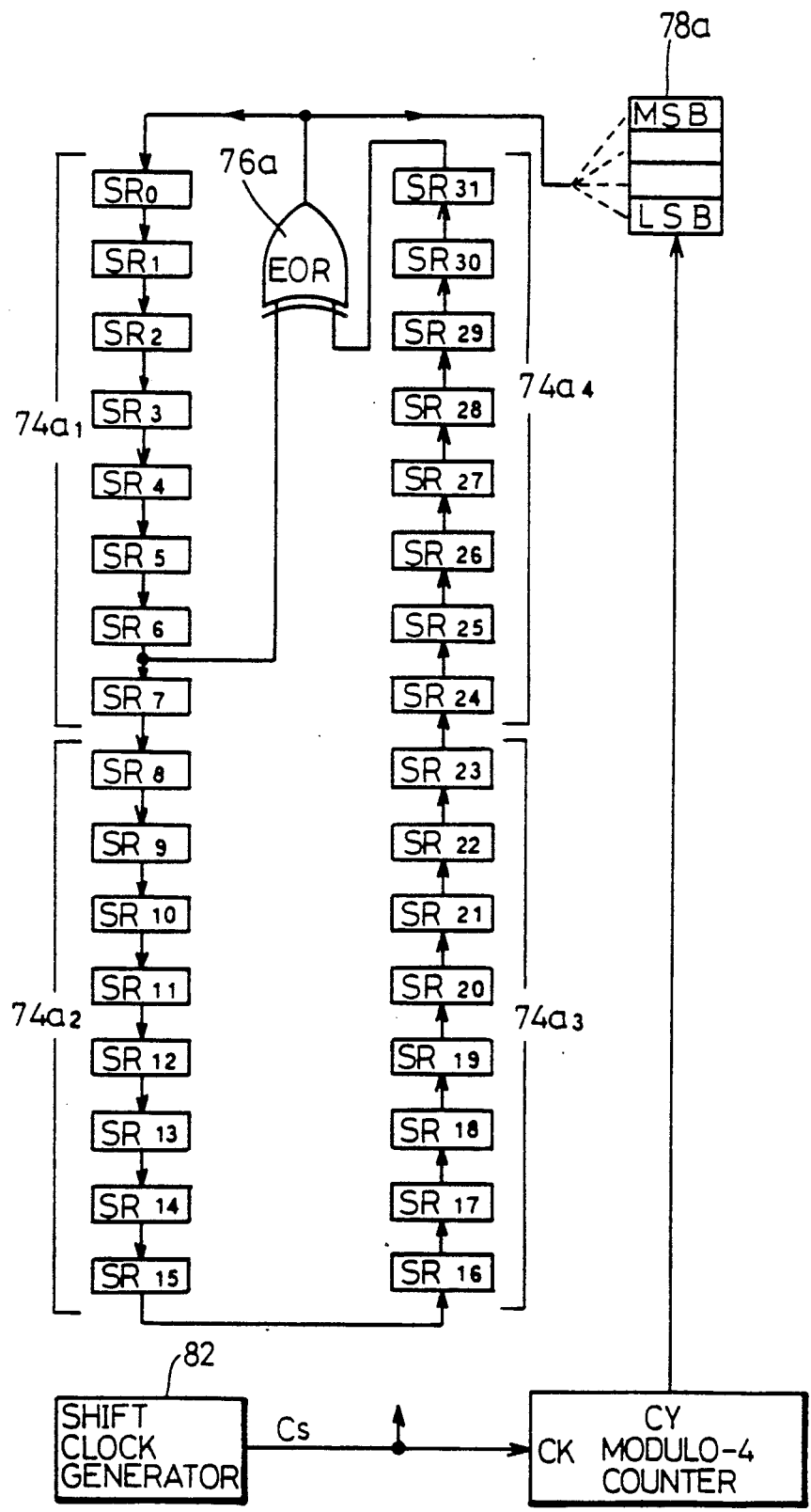
FIG. 13 is a diagram explaining the principles of an algorithm for generating random numbers with the random number generator illustrated in FIG. 12.

FIG. 13 shows an algorithm for generating random numbers based on the M-sequences coding theory to produce the digital random number data R with the random number generator 70 shown in FIG. 12. As described above, the random number generating circuits $72a$, $72b$ are substantially identical to each other. Therefore, the algorithm for generating 4-bit random numbers will be described with reference to the random number generating circuit $72a$. Denoted at $SR_0$ through $SR_{31}$ are 1-bit shift registers, respectively, which make up the shift registers $74a_1$ through $74a_4$, and are connected in series. The output signal from the seventh shift register $R_6$ and the output signal from the thirty-second shift register $SR_{31}$ are input signals to the EOR $76a$. The output signal from the EOR $76a$ is applied to the serial/parallel converter $78a$ and also to the the input terminal of the first shift register $SR_0$.

The shift registers SR through $SR_{31}$ are given an initial value of 0 or 1 by the non-illustrated initial value presetting circuit. When four shift clock pulses Cs from a shift clock generator 82 are applied to the shift registers $R_0$ through $R_{31}$, the output serial/parallel converter $78a$ stores 4-bit random number data, which are then output as 4-bit parallel random number data to the combinational circuit 80. If the initial values of the shift registers $SR_0$ through $SR_{31}$ are all preset values other than 0, then there is no limitation on the initial values.

Likewise, 4-bit random numbers are generated by the random number generating circuit $72b$ and output to the combinational circuit 80. The random number generating circuit $72b$ differs in operation from the random number generating circuit $72a$ in that one of the input signals applied to the EOR $76b$ is the output signal from the tenth shift register $SR_9$ of the random number generating circuit $72b$, whereas one of the input signals applied to the EOR $76a$ is the output signal from the seventh shift register $SR_6$ of the random number generating circuit $72a$ (FIG. 12).

In response to the 4-bit random numbers respectively from the random number generating circuits $72a$, $72b$, the combinational circuit 80 outputs 8-bit digital random number data R through the combination of the input and output terminals thereof. Since the random numbers so produced by each of the random number generating circuits $72a$, $72b$ is of a periodic nature which is represented by $2^{32} - 1$ (=4 billions), the randomness of the generated random numbers is sufficiently high.

In the second embodiment described above, the random number input ports connected to the EOR $76a$ of the M-sequences random number generating circuit $72a$ lead from the output terminal of the seventh shift register $R_6$ (which output terminal corresponds to the seventh output terminal $Q_7$ of the shift register $74a_1$) and the output terminal of the thirty-second shift register $SR_{31}$ (which output terminal corresponds to the eighth output terminal $Q_7$ of the shift register $74a_4$). However, it can easily be understood that the random number input can be derived from the output terminal of the shift register $SR_2$ or the output terminal of the shift register $SR_4$ rather than the shift register $R_6$ to produce random numbers. This holds true for the M-sequences random number generating circuit $72b$.

Figure 14A:
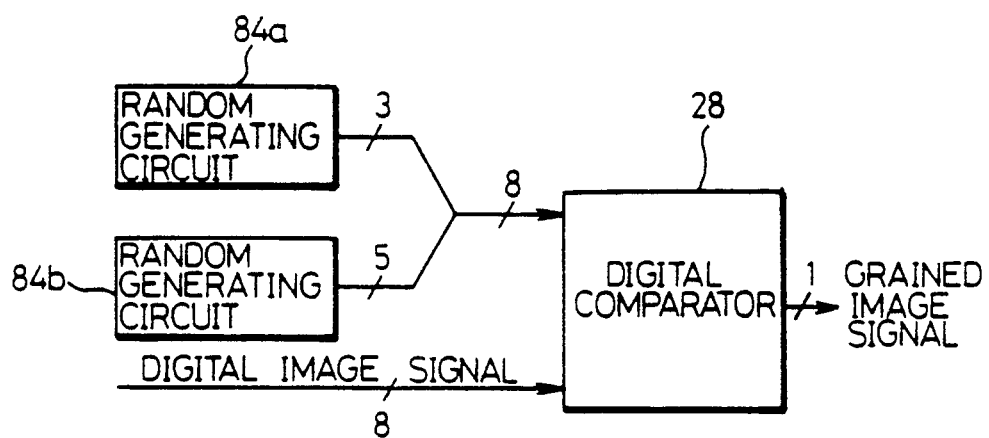
FIGS. 14(a) through 14(c) are block diagrams of image signal processing apparatus according to other embodiments of the present invention.
Figure 14B:
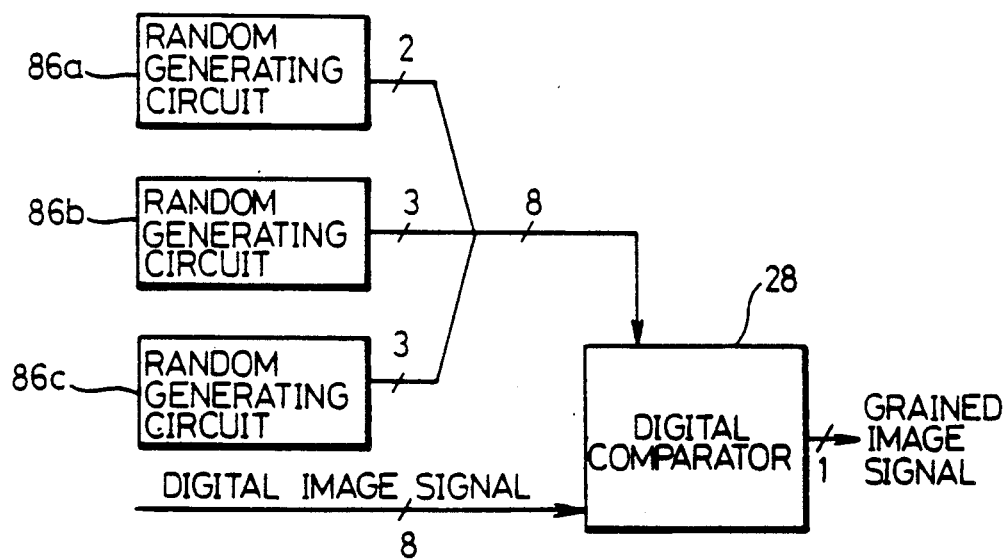

In the second embodiment, two 4-bit random number generating circuits are employed to produce 8-bit random numbers. However, 3-bit and 5-bit random number generating circuits $84a$, $84b$ (FIG. 14(a)) may be employed to produce 8-bit random numbers. Moreover, 2-bit, 3-bit, and 3-bit random number generating circuits $86a$, $86b$, $86c$ (FIG. 14(b)) may be employed to produce 8-bit random numbers.

Figure 14C:
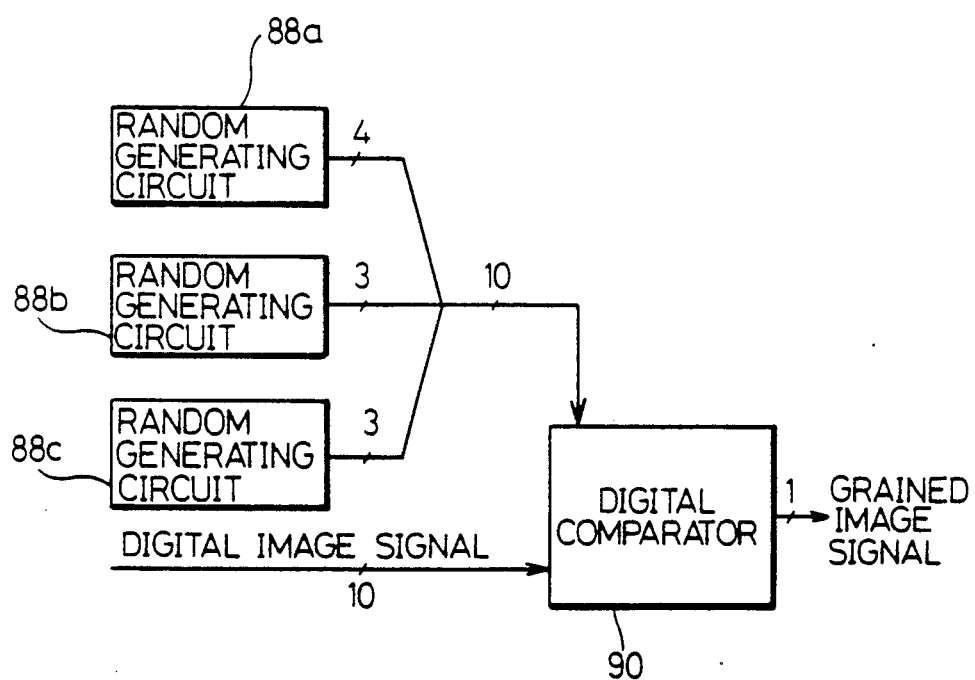

Furthermore, while a grained image signal is produced by the 8-bit random number data in the second embodiment, random number data for graining an image signal may be of 10 bits or more bits produced by an arrangement of FIG. 14(c) which comprises random number generating circuits $88a$, $88b$, $88c$ for generating 4-bit, 3-bit, and 3-bit random numbers and a 10-bit digital comparator 90.

With the present invention, for graining image data, digital image data and M-sequences random number data are binarized by a digital comparator. Therefore, image processing can be performed at considerably high speed.

Alternatively, for graining image data, digital image data and digital random data produced by combining M-sequences random numbers generated by a plurality of random number generating circuits are binarized by a digital comparator. Therefore, an apparatus for graining image data at high speed can be realized at a low cost, and a high-quality grained image can be produced.

The present invention employs a circuit arrangement which is reliably operable to produce random number data using shift registers without employing a zener diode or the like, so that the circuit adjustments are made unnecessary. In addition, since the correlation of random number data can easily be controlled in auxiliary and main scanning directions, an image can be magnified to meet printing characteristics.

Although certain preferred embodiments have been shown and described, it should be understood that many changes and modifications may be made therein without departing from the scope of the appended claims.

What is claimed is:

1. An apparatus for processing an image signal, wherein an original is fed in an auxiliary scanning direction and is scanned in a main scanning direction to produce said image signal, said apparatus comprising:
    a digital comparator for comparing digital image data and graining reference data to produce grained image data; and
    a random number generator for producing, as said graining reference data, digital random number data based on an M-sequences coding theory, wherein said random number generator comprises a random number generating circuit based on said M-sequences coding theory and an initial value presetting circuit for setting an initial value in said random number generating circuit, said random number generating circuit having an output port comprising an N-bit shift register (N=2, 3, 4, ... ), the arrangement being such that N-bit digital random data are updated each time a signal shift clock pulse is applied.

2. An apparatus according to claim 1, wherein said random number generator further comprises a first frequency divider, having a first dividing ratio, into which a first scanning clock signal for main scanning is introduced, and said initial value presetting circuit further comprises a second frequency divider, having a second dividing ratio, into which a second scanning clock signal for auxiliary scanning is introduced, whereby the generation of said digital random number data corresponding respectively to said main scanning and auxiliary scanning directions is controlled in accordance with said first and second dividing ratios of said first and second frequency dividers, respectively.

3. An apparatus according to claim 1, wherein said random number generator comprises a plurality of shift registers, and wherein said initial value presetting circuit comprises a plurality of counters, wherein the outputs from respective pairs of said counters are supplied as input data to each of said shift registers.

4. An apparatus for processing an image signal, said apparatus comprising:
    a digital comparator for comparing digital image data and grain reference data to obtain processed data processed by graining reference data, wherein said processed data is obtained by reading out an original fed in an auxiliary scanning direction and scanned in a main scanning direction; and
    a random number generator for producing, as said graining reference data, digital random number data based on an M-sequences coding theory, said random number generator comprising a random number generating circuit based on said M-sequences coding theory, said random number generator comprising a plurality of shift registers, and an initial value presetting circuit for setting an initial value in said random number generating circuit, said initial value presetting circuit comprising a plurality of counters wherein the outputs from respective pairs of said counters are supplied as input data to each of said shift registers;
    wherein said random number generator further comprises a first frequency divider into which a main scanning clock signal is introduced, and said initial value presetting circuit further comprises a second frequency divider into which an auxiliary scanning clock signal is introduced, whereby said digital random number data is updated according to said clock signals corresponding respectively to said main scanning and auxiliary scanning directions.

* * * * *